US009569973B2

(12) United States Patent
Eaton, Jr. et al.

(10) Patent No.: US 9,569,973 B2
(45) Date of Patent: Feb. 14, 2017

(54) METHOD OF GENERATING AND DISPLAYING A FLARE DRIFT VECTOR SYMBOL

(71) Applicant: The Boeing Company, Chicago, IL (US)

(72) Inventors: Douglas J. Eaton, Jr., Franklinville, NJ (US); Scott T. Dubeck, Philadelphia, PA (US)

(73) Assignee: The Boeing Company, Chicago, IL (US)

( * ) Notice: Subject to any disclaimer, the term of this patent is extended or adjusted under 35 U.S.C. 154(b) by 46 days.

(21) Appl. No.: 14/497,621

(22) Filed: Sep. 26, 2014

(65) Prior Publication Data

US 2016/0117930 A1    Apr. 28, 2016

(51) Int. Cl.
*G08G 5/00* (2006.01)
*G01C 21/20* (2006.01)
*F42B 4/28* (2006.01)
*F41H 11/02* (2006.01)

(52) U.S. Cl.
CPC .............. *G08G 5/0039* (2013.01); *F42B 4/28* (2013.01); *G01C 21/20* (2013.01); *G08G 5/0021* (2013.01); *F41H 11/02* (2013.01)

(58) Field of Classification Search
CPC ............. G01S 5/02; H04N 7/18; H04B 7/185; G08G 5/0039; G08G 5/0021; F42B 4/28; G01C 21/20; F41H 11/02
See application file for complete search history.

(56) References Cited

U.S. PATENT DOCUMENTS 4,121,246 A * 10/1978 Fadden ..................... F41G 9/02
340/971
5,798,733 A * 8/1998 Ethridge ................ G01C 21/20
342/357.34

* cited by examiner

*Primary Examiner* — John Q Nguyen
*Assistant Examiner* — Michael Kerrigan
(74) *Attorney, Agent, or Firm* — Baldauff IP, LLC; Michael J. Baldauff, Jr.

(57) ABSTRACT

The present disclosure is generally directed to a method of generating and displaying a parachute flare drift vector symbol on a navigation display of the aircraft capable of deploying a flare relative to a real-time navigation map. The flare drift vector symbol includes a flare ignition forward/aft distance relative to the aircraft deploying the flare, a flare ignition left/right distance relative to the aircraft deploying the flare, a flare burn vector distance, and a flare burn vector direction. The flare drift vector symbol is generating based on the flare parameters, the wind parameters, the flare drift distance, the flare drift direction and the aircraft parameters.

17 Claims, 13 Drawing Sheets

METHOD OF GENERATING AND DISPLAYING A FLARE DRIFT VECTOR SYMBOL

STATEMENT OF RIGHTS OWNED

The invention was made with Government support awarded by the Department of Defense according to Contract No. N00019-12-G-0006 DO44. The government has certain rights in this invention.

TECHNICAL FIELD

The field of the embodiments presented herein is directed toward displaying a predicted burn track distance and direction of a parachute flare in real-time on a navigation display that allows a pilot to make real-time adjustments to an aircraft flight path in order to effectively use the flare in a dynamic battlefield environment.

BACKGROUND

Currently pilots must estimate where to release a flare to achieve the desired illumination levels of a target and prevent it from being a hazard to ground forces and other aircraft. The pilot is required to do hand calculations that factor in current wind, altitude and temperature en-route to the objective area. This increases pilot workload and relies on pilot estimations for where a flare release will be safe and effective.

In the current solution, pilots first determine the area they need to illuminate and a safe location for the flare to burn out. Next, they compute the point where the aircraft needs to release the flare at a release point. This is a hand calculation using estimated wind conditions. The release point is only accurate if the wind estimate is accurate and if the aircraft approaches the release point from the direction used to calculate the release point. There is no symbol that is displayed on a map to validate the acceptability of the release point. Battlefield plans can change with short notice and require illuminating a different area or approaching the same area from a different direction. When the flare is released, the extent to which the actual wind and aircraft parameters deviate from the plan introduces error that will result in the actual path of the parachute flare not matching the original planned path.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a method of generating and displaying a flare drift vector symbol includes inputting into a computing device flare parameters for a flare capable of being deployed by an aircraft, inputting into the computing device wind parameters including a wind direction and a wind magnitude for a given flare ignition altitude, inputting into the computing device a flare drift distance and a flare drift direction for the given flare ignition altitude and inputting into the computing device aircraft parameters including an aircraft speed and an aircraft direction. The method further includes generating, by the computing device, the flare drift vector symbol based on the flare parameters, the wind parameters, the flare drift distance, the flare drift direction and the aircraft parameters. The flare drift vector symbol includes a flare ignition forward/aft distance relative to the planned midpoint of a planned burn track, a flare ignition left/right distance relative to the planned midpoint of a planned burn track, a flare burn vector distance, and a flare burn vector direction. The method further includes displaying the flare drift vector symbol on a navigation display of the aircraft capable of deploying the flare relative to a real-time navigation map. Calculated flare drift vector data can be transmitted via a data link to other aircraft and ground troupes to provide them with battle space situational awareness.

In another embodiment disclosed herein, a method of generating and displaying a release point for a flare capable of being deployed by an aircraft includes inputting into a computing device a planned midpoint of a planned burn track of the ignited flare, inputting into the computing device flare parameters for the flare capable of being deployed by the aircraft, inputting into the computing device wind parameters including a wind direction and a wind magnitude for a given flare ignition altitude, inputting into the computing device a flare drift distance and a flare drift direction for the given flare ignition altitude, and inputting into the computing device aircraft parameters including an aircraft speed and an aircraft direction. The method further includes generating by the computing device a flare drift vector based on the flare parameters, the wind parameters, the flare drift distance, the flare drift direction and the aircraft parameters. The method further includes calculating by the computing device a midpoint of the flare drift vector, and determining by the computing device a release point of the flare such that the planned midpoint of the planned burn track of the ignited flare coincides with the midpoint of the flare drift vector. The method further includes displaying the release point on a navigation display of the aircraft capable of deploying the flare relative to a real-time navigation map.

In another embodiment disclosed herein, a method of recalculating and displaying a release point and an associated flight path for a flare capable of being deployed by an aircraft includes providing a first planned flight path including a first planned release point thereon for the flare capable of being deployed by the aircraft, the first planned flight path being determined based on first wind parameters including a first wind speed and a first wind direction, and a planned midpoint of a planned burn track of the ignited flare, where the planned midpoint is located at an aircrew selected geographical location. The method further includes inputting into a computing device second wind parameters including a second wind direction and a second wind magnitude for a given flare ignition altitude, inputting into the computing device a flare drift distance and a flare drift direction for the given flare ignition altitude, and inputting into the computing device aircraft parameters including an aircraft speed and an aircraft direction. The method further includes generating by the computing device a flare drift vector based on flare parameters, the second wind parameters, the flare drift distance, the flare drift direction and the aircraft parameters. The method further includes calculating by the computing device a midpoint of the flare drift vector, and determining by the computing device a second release point of the flare such that the planned midpoint of the planned burn track of the ignited flare coincides with midpoint of the flare drift vector. The method further includes generating by the computing device a second flight path including the second release point of the flare thereon, and displaying the second release point and the second flight path on a navigation display of the aircraft capable of deploying the flare relative to a real-time navigation map.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

Figure 1:
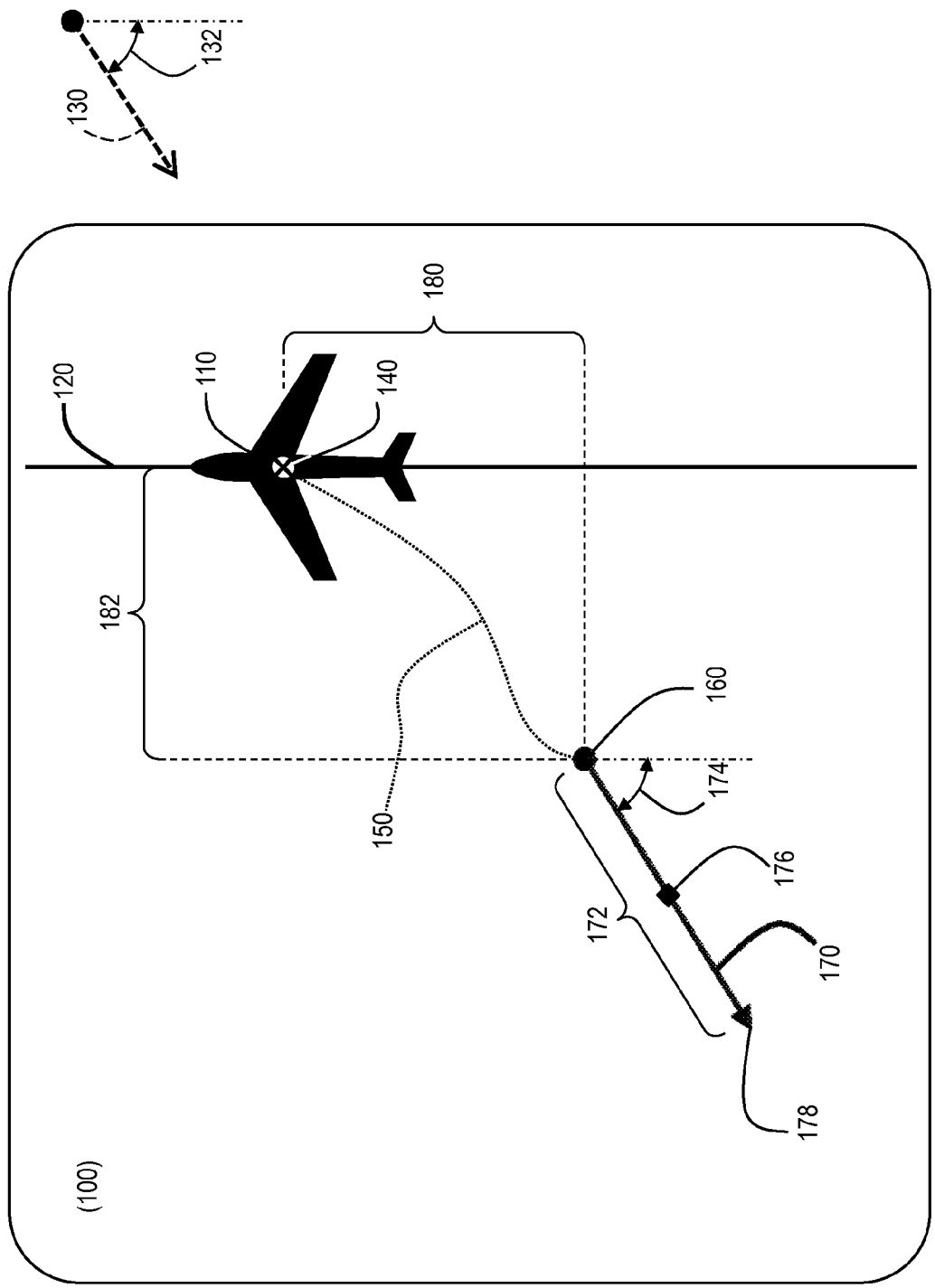
FIG. 1 illustrates a top schematic view of a graphical display according to at least one embodiment disclosed herein.

The following detailed description is directed to the display of a flare drift vector symbol on a navigation display based on real-time aircraft data that provides the crew with important situational awareness information that increases the safety of ground forces and other aircraft while helping the crew make on the fly decisions for releasing the flare. Utilizing the concepts described below, the crew can more accurately drop flares in multiple locations and from any direction, simply by steering the aircraft to position the flare symbol where desired on a navigation display and are no longer constrained to release flares at the rigid planned location and direction. Additionally, the use of real-time system winds provides a more accurate solution than the planned wind estimate based on weather forecasts. Displaying the predicted burn track distance and direction of a parachute flare increases the accuracy of dropping the flare as well as improves the safety of the mission. It provides the pilot with the flexibility to make real-time adjustments to the aircraft flight path in order to effectively use the flare in a dynamic battlefield environment.

The embodiments described below begin with the pilot determining the area needed to illuminate and a safe location for the flare to burn out. The crew enters the appropriate data into the system that calculates the parameters needed to display the symbol (such as a mission computer on an aircraft). This system displays a symbol on the map that represents where to release the flare and where it will travel so that the crew can quickly ascertain if this solution is acceptable. Additionally, the system can calculate the flare drift vector symbol and display it relative to the current aircraft position using actual wind conditions measured by the aircraft. As the aircraft moves, the flare drift vector symbol is updated on the map to represent a real time picture of where a parachute flare will travel if released at the current location. The symbol is constantly recalculated and displayed. If conditions change while navigating to the release point, this flare drift vector symbol will update accordingly and can be used validate the effectiveness of dropping a flare at a different location.

A flare drift vector symbol represents the distance and direction a parachute flare will travel while it is ignited and drifting with the wind under the parachute canopy. This flare drift vector symbol is displayed on a digital moving map in the cockpit of an aircraft that drops flares to illuminate target areas (known as battlefield illumination). The current flare drift vector symbol is displayed relative to the current position of the aircraft and represents where the flare will travel if it is ejected from the aircraft at the current time. It can also be displayed relative to a fixed ground target to represent where a flare will travel if released at a predetermined position under predetermined conditions. This flare drift vector symbol provides the aircrew with important situational awareness information that increases the safety of ground forces and other aircraft while helping the aircrew make on the fly decisions for releasing the flare.

FIG. 1 illustrates a top schematic view of a graphical display according to at least one embodiment disclosed herein. A navigation display 100 graphically illustrates an aircraft/ownship position 110 with respect to a flight path 120. The flight computer (not shown) that controls the navigation display 100 either determines or receives an input wind speed 130 and a wind angle/direction 132 for an planned flare ignition point and/or a current flare ignition point if the flare were immediately released from the aircraft.

A planned flare release point 140 is located on the flight path 120 such that when the aircraft/ownship position 110 is aligned with the planned flare release point 140, the flare is deployed. A flare pre-chute deployment free-fall path 150 is illustrated between the aircraft/ownship position 110 beginning on the planned flare release point 140 and terminates at a flare ignition point 160 where the flare is ignited. A flare drift vector symbol 170 (or a planned flare burn track) is illustrated relative to the aircraft/ownship position 110 that includes a graphical representation of a flare drift vector drift distance 172 and a flare drift vector drift angle/direction 174. Additionally illustrated on the flare drift vector symbol 170 is graphical mark indicating a flare drift vector midpoint 176 (or the battlefield illumination (BFI) waypoint) that represents the midpoint of the planned flare burn track. Finally, the end of the flare drift vector symbol 170 represents a flare burn-out point 178 where the flare is extinguished and then subsequently falls to the ground. The flare ignition point 160 is calculated by a processing unit on the aircraft based on the wind speed 130 and a wind angle/direction 132 for the flare ignition point 160, aircraft speed and direction of travel, and includes a distance forward/aft 180 of aircraft/ownship to flare ignition point 160 and a distance left/right 182 of aircraft/ownship to flare ignition point 160.

Planning to deploy a flare includes assessing the illumination target and surrounding area to identify a suitable geographic location coordinate where the flare drift vector midpoint 176 is to be aligned with. The midpoint of the planned flare burn track represents the average position of the flare burn track over the time the flare is ignited, and the position where illumination from the flare will be lit for the longest period of time once the deployed flare is ignited. Once the planned coordinate of the flare drift vector midpoint 176 is determined based on the geographic location coordinate, the flare ignition point 160 may be determined from the wind speed 130 and wind direction 132 at the flare ignition point 160, from any number of points along the flare pre-chute deployment free-fall path 150, and from the release point 140 of the aircraft 110 on a given flight path 120. The planned flare ignition point 160 will then have the forward/aft distance 180 relative to release point 140 that the aircraft/ownship 110 navigates to and the left/right distance 182 also relative to the release point 140 that the aircraft/ownship 110 navigates to. In an alternative embodiment planning to deploy a flare includes identifying a geographical location coordinate and for releasing a flare 140. A flare ignition point 160 may be determined from aircraft speed, aircraft direction 120, wind speed 130 and wind direction 132 at the release point 140. The planned flare ignition point 160 will then have the forward/aft distance 180 relative to release point 140 and a left/right distance 182 also relative to the release point 140. When this is displayed on a navigation display the aircrew can assess if the planned release point coordinates are acceptable.

Figure 2:
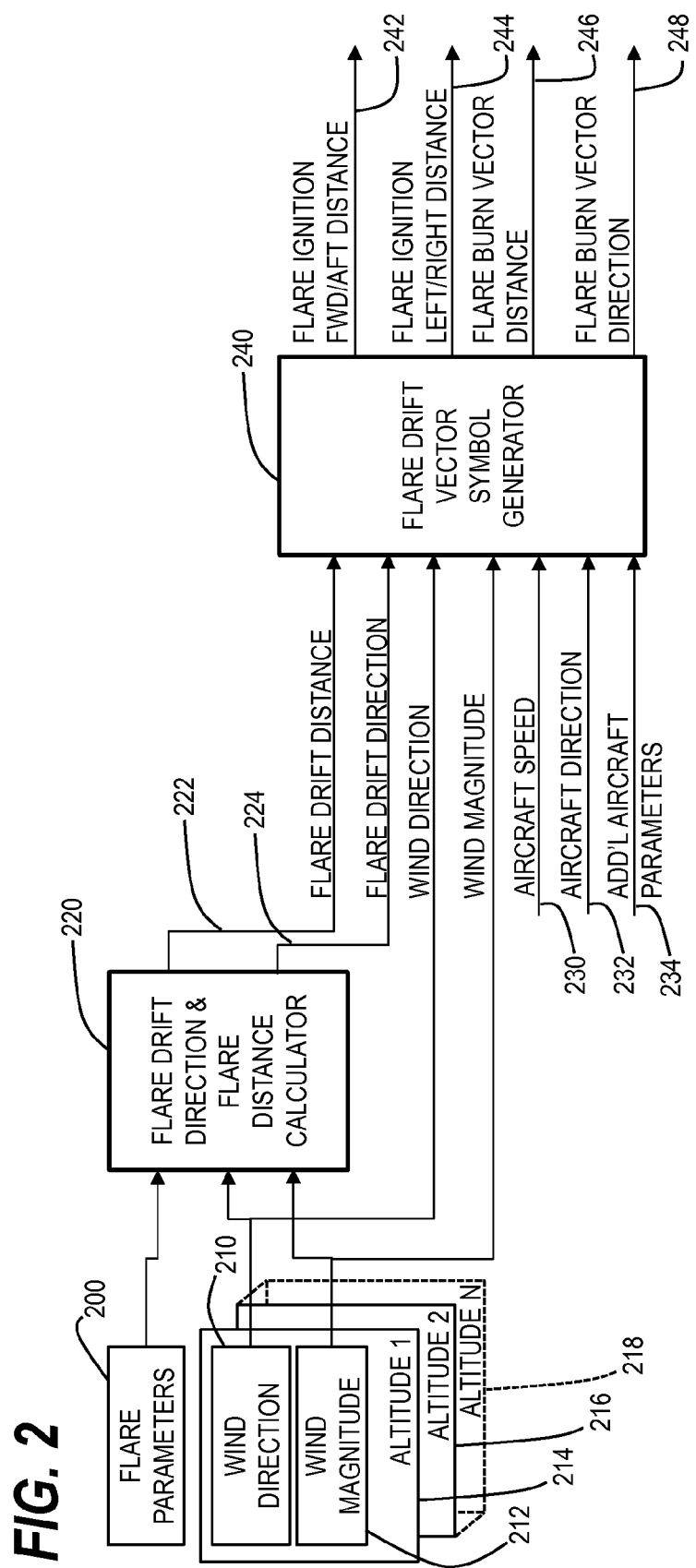
FIG. 2 illustrates a schematic view of a process of generating a flare drift vector symbol according to at least another embodiment disclosed herein.

FIG. 2 illustrates a schematic view of a process of generating a flare drift vector symbol according to at least another embodiment disclosed herein. Flare parameters 200 including a total flare burn time, a flare ignition delay timer, and wind direction and wind speed are entered into a flare drift direction and flare distance calculator 220. Additionally, a wind direction 210 and wind magnitude 212 at a given altitude 214 may be entered into a flare drift direction and flare distance calculator 220. In an alternative embodiment, a wind direction and wind magnitude pair of values for a second given altitude 216 may be entered into a flare drift direction and flare distance calculator 220. As shown, a plurality of given altitudes 218 may have corresponding pairs of wind direction and wind magnitude values that may be entered into a flare drift direction and flare distance calculator 220 if desired.

The flare drift and flare distance calculator 220 outputs a flare drift distance 222 and a flare drift direction 224 that is input into a flare drift vector symbol generator 240 in addition to the wind direction 210 and the wind magnitude 212 at a given altitude 214, (or altitudes 218), an aircraft/ownship speed 230, an aircraft/ownship direction 232, and additional aircraft/ownship parameters 234 that may include ambient temperature, as well as any other applicable aircraft or environmental conditions. The flare drift vector symbol generator 240 generates the flare drift vector symbol for display on a navigation unit display that includes a flare ignition forward/aft distance relative to release point of the flare and the aircraft/ownship 242, a flare ignition left/right distance relative to release point of the flare and the aircraft/ownship 244, a flare burn vector distance 246 and a flare burn vector direction 248.

Figure 3:
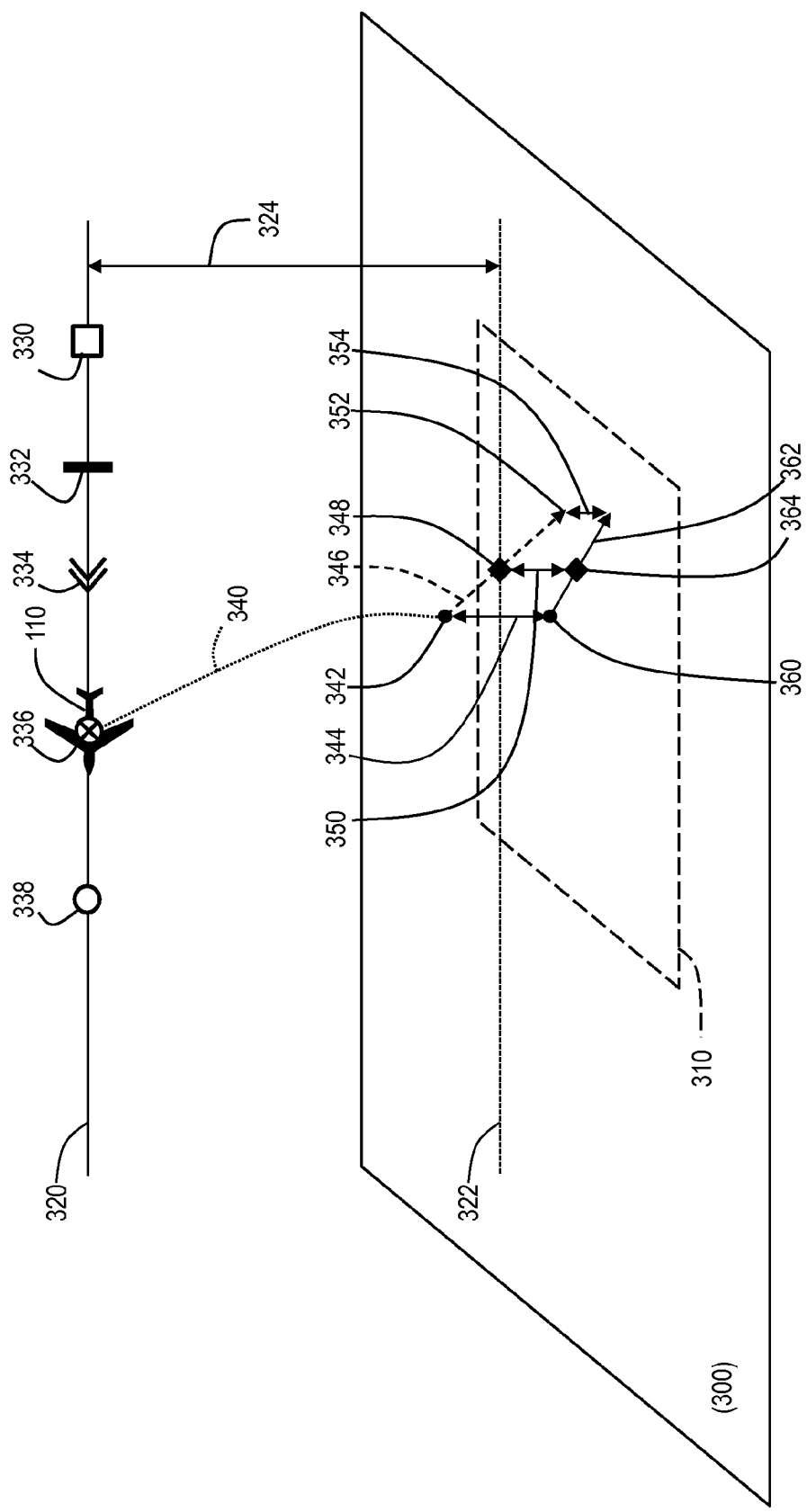
FIG. 3 illustrates a perspective view of an aircraft on a flight path and a deployed flare free fall trajectory and subsequent parachute deployment, flare ignition point and flare burn track relative to a terrain-based operating zone according to at least another embodiment disclosed herein.

FIG. 3 illustrates a perspective view of an aircraft on a flight path, a deployed flare free fall trajectory and subsequent parachute deployment, flare ignition point and flare burn track relative to a terrain-based operating zone according to at least another embodiment disclosed herein. Terrain 300 is illustrated as a trapezoidal plane that includes an illustration of an operating zone 310 therein. A flight plan 320 is illustrated as a line above the terrain 300 and for illustration purposes casts a projected flight plan 322 on the terrain 300 below. The flight plan 320 also contemplates a flight plan altitude 324 above the terrain 300.

An aircraft typically follows the flight plan 320 being represented by the aircraft/ownship position 110 indicator on the flight plan 320. The flight plan 320 may include an air drop initial point 330 (initial line-up point on flight plan), an initial slowdown point 332 to an aircraft "drop-speed," a look time point 334 to verify final speed, altitude and bearing readings, a release point 336 where the flare is released along the flight path, and an escape point 338 where the aircraft may initiate an exit of the flight path.

The flare upon release at the release point 336 descends along a flare pre-chute deployment free-fall path 340 until chute deployment when the flare timer expires. A flare ignition point 342 indicates the point at which the flare ignition takes place and the parachute is deployed at a flare ignition point altitude 344. Thereafter the flare follows a flare descent path 346 based on the wind speed, wind direction as previous discussed and at an ignited flare descent rate. A flare descent path midpoint 348 is a graphical mark indicating a midpoint of the flare descent path 346 at a flare descent path midpoint altitude 350. A flare burn-out point 352 having a flare burn-out altitude 354 indicates the end point of the flare descent path 346.

A displayed flare ignition point 360 is a top-down projection of the flare ignition point after chute deployment 342 on the terrain 300. A displayed flare drift vector 362 (planned burn track) is a top-down projection of the flare descent path 346 on the terrain 300, and a displayed flare drift vector drift midpoint 364 (battlefield illumination (BFI) waypoint) is a top-down projection of the flare descent path midpoint 348. The displayed flare ignition point 360, displayed flare drift vector 362 and the displayed flare drift vector drift midpoint 364 are the components that are displayed in a top-down manner in the navigation display of the aircraft.

Similar to FIG. 1, planning to deploy a flare relative to FIG. 3 includes first determining a planned geographic location coordinate on the ground for locating the displayed flare drift vector drift midpoint 364 that a flare is intended to be illuminated above and aligned accordingly with the flare drift vector midpoint 348. The midpoint 348 of the planned flare burn track 346 represents the average position of the flare burn track over the time the flare is ignited, and the position where illumination from the flare will be lit for the longest period of time once the deployed flare is ignited. Once the planned coordinate of the flare drift vector midpoint 348 is determined based on the geographic location coordinate, the flare ignition point 342 may be determined from the wind speed and wind direction at the flare ignition point 342, from any number of points along the flare pre-chute deployment free-fall path 340.

Figure 4:
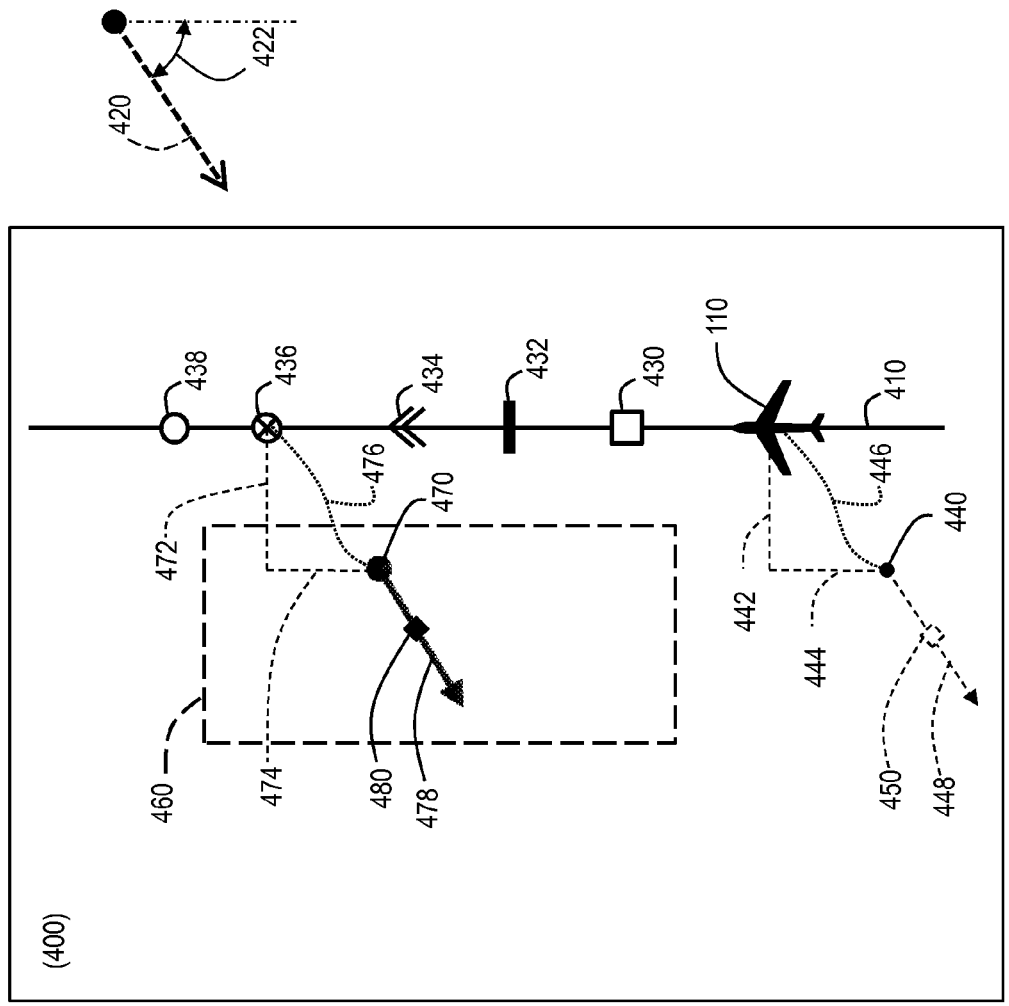
FIG. 4 illustrates a top schematic view of an aircraft on a flight path and a deployed flare free fall trajectory and subsequent parachute deployment, flare ignition point and flare burn track relative to a terrain-based operating zone according to at least another embodiment disclosed herein.

FIG. 4 illustrates a top schematic view of an aircraft on a flight path and a deployed flare free fall trajectory and subsequent parachute deployment, flare ignition point and flare burn track relative to a terrain-based operating zone according to at least another embodiment disclosed herein. A map portion on a navigation display 400 illustrates a flight plan 410 that indicates an aircraft/ownship position 110. As discussed above, the flight computer (not shown) that controls the navigation display either determines or receives an input wind speed 420 and a wind angle/direction 422 for an intended flare ignition point 470 or a current flare ignition point 440 if the flare were immediately released from the aircraft. The flight plan 410 further includes an air drop initial point 430 (initial line-up point on flight plan), an initial slowdown point to "drop-speed" airspeed 432, a look time point 434 to verify final speed, altitude and bearing readings, a planned flare release point 436, and an aircraft/ownship escape point 438.

A current flare ignition point 440 is determined by a distance left/right 442 of the aircraft/ownship position 110 to the current flare ignition point 440, and a distance forward/aft 444 of the aircraft/ownship position 110 to current flare ignition point 440. The current flare ignition point 440 is the position a given flare would ignite if deployed from the aircraft at the current aircraft/ownship position 110. A current flare pre-chute deployment free-fall path 446 is indicated as the flare descends before parachute deployment and the subsequent flare ignition.

A current flare drift vector 448 (current burn track) is displayed on the map portion on the navigation display 400 from the current flare ignition point 440 that indicates both the distance and relative angle or bearing of the path of the ignited flare. A current flare drift vector drift midpoint 450 is graphical mark indicating the midpoint of the current flare drift vector 448 indicating the midpoint of illumination on the below terrain given the current flare drift vector 448.

FIG. 4 illustrates an operating zone 460 on the map portion 400 of the navigation display having a planned flare ignition point 470 defined by a distance left/right 472 at the release point 436 to the planned flare ignition point 470, and a distance forward/aft 474 at the release point 436 to planned flare ignition point 470. A planned flare pre-chute deployment free-fall path 476 is illustrated from the release point 436 to the planned flare ignition point 470. A planned flare drift vector 478 (planned burn track) is displayed on the on the map portion 400 of the navigation display with a planned flare drift vector drift midpoint 480 (planned battlefield illumination (BFI) waypoint). FIG. 4 illustrates a display 400 that displays both the current flare drift vector 448 and the planned flare drift vector 478 to indicate to the flight crew both vectors. Display 400 may display only the planned flare drift vector 478 without displaying the current flare drift vector 448, or may display only the current flare drift vector 448 without displaying the planned flare drift vector 478. Additionally, the current flare pre-chute deployment free-fall path 446 and the planned flare pre-chute deployment free-fall path 476 may or may not be displayed on the display 400 relative to either the displayed current or planned flare drift vectors 448 and 478, respectively.

Figure 5:
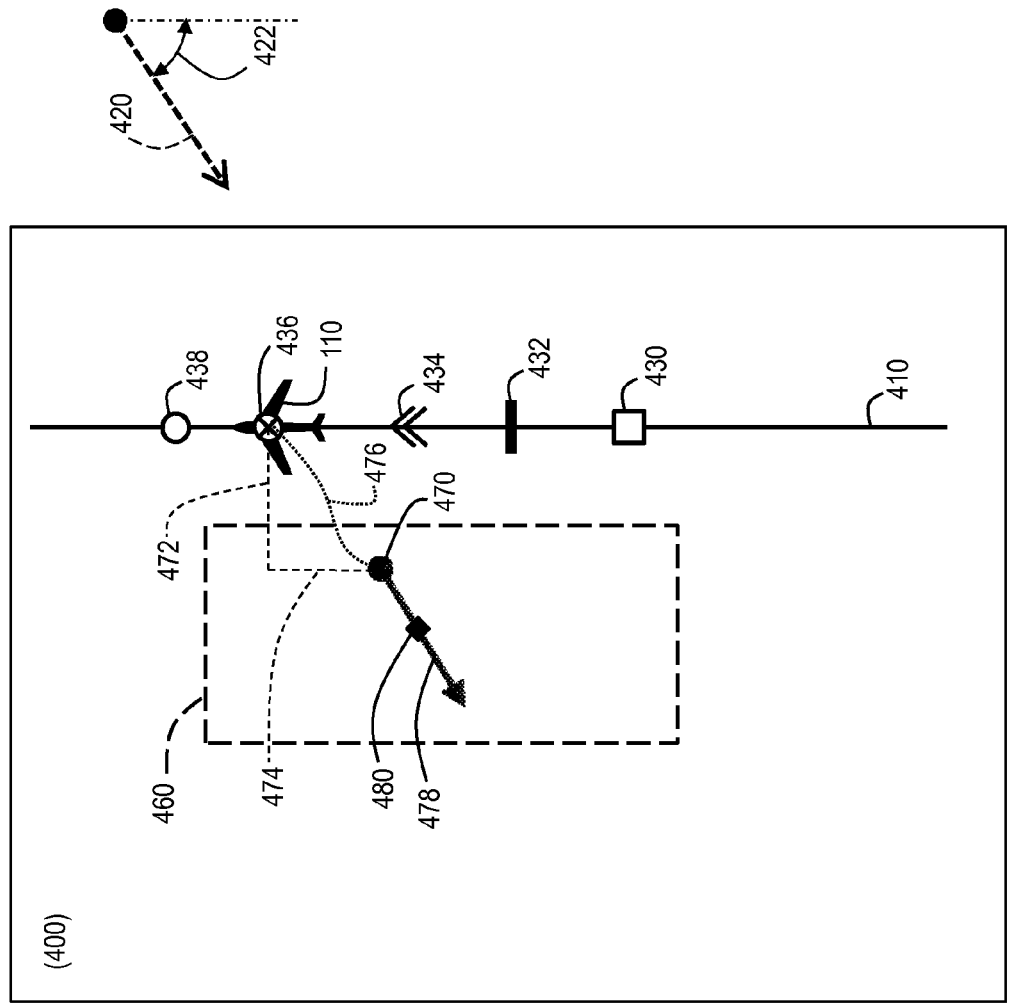
FIG. 5 illustrates a top schematic view of an aircraft at a release point on a flight path and a deployed flare free fall trajectory and subsequent parachute deployment, flare ignition point and flare burn track relative to a terrain-based operating zone according to at least another embodiment disclosed herein.

FIG. 5 illustrates a top schematic view of an aircraft at a release point on a flight path and a deployed flare free fall trajectory and subsequent parachute deployment, flare ignition point and flare burn track relative to a terrain-based operating zone according to at least another embodiment disclosed herein. FIG. 5 is similar to FIG. 4 with the exception that the aircraft/ownship indicator 110 now coincides with the release point 436 on the flight plan 410. When the occurrence of the aircraft/ownship indicator 110 coincides with the release point 436 on the flight plan 410, a flare may be automatically deployed or an indication may be given for a manual deployment of the flare such that the current planned flare drift vector 448 (as shown in FIG. 4) may be substantially aligned with the planned flare drift vector 478. The flare ignites at the planned flare ignition point 470 and begins its path along the planned flare drift vector 478 such that the planned flare drift vector drift midpoint 480 coincides with the planned geographic location on the map needing illumination.

Figure 6:
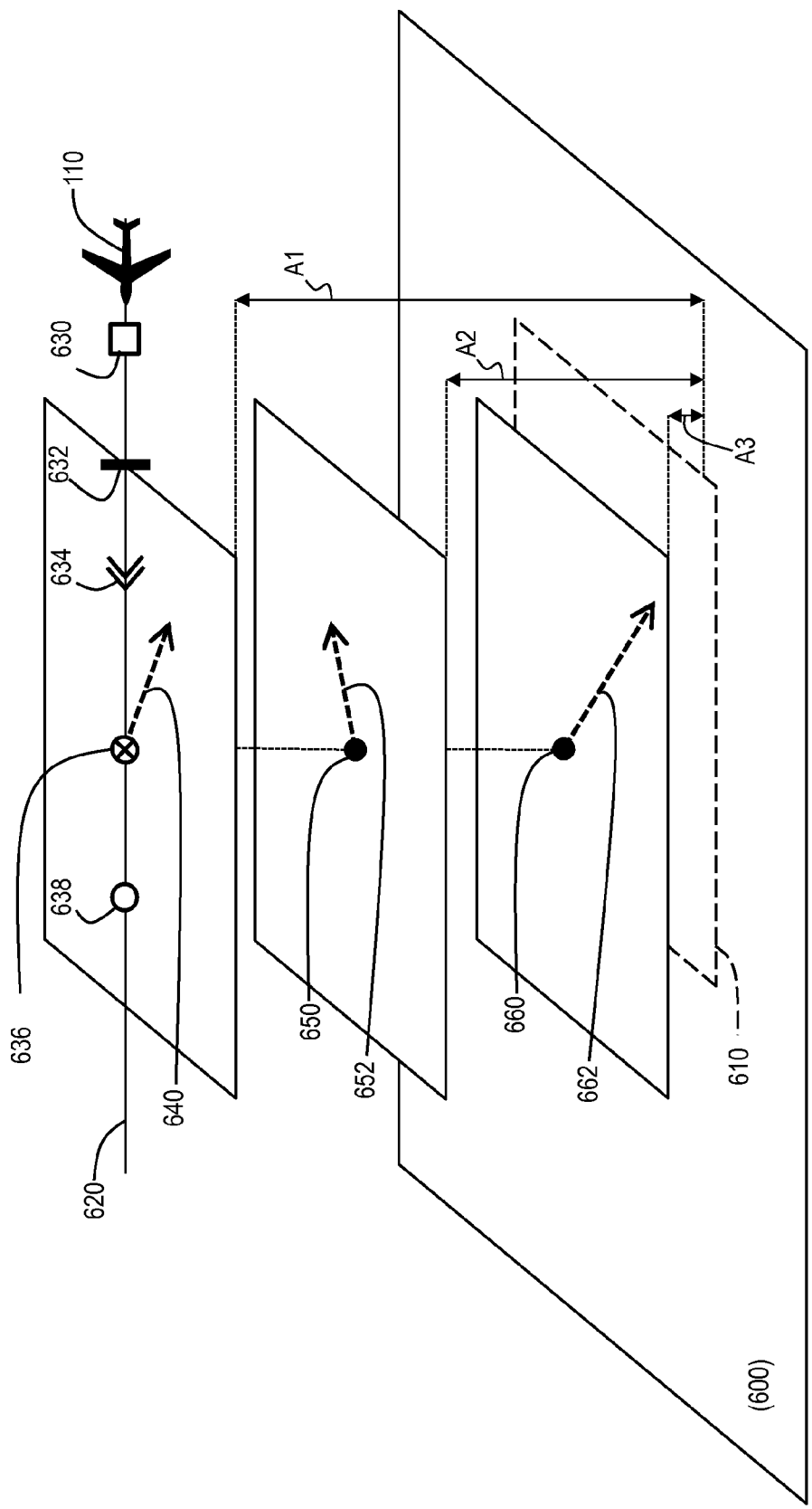
FIG. 6 illustrates a schematic view of representations of wind vectors at various altitudes including the flight plan altitude according to at least another embodiment disclosed herein.

FIG. 6 illustrates a schematic view of representations of wind vectors at various altitudes including the flight plan altitude according to at least another embodiment disclosed herein. Terrain 600 is illustrated as a trapezoidal plane (similar to FIG. 2) that includes an illustration of an operating zone 610 therein. A flight plan 620 with a given aircraft/ownship position 110 is illustrated as a line above the terrain 600 at a flight plan altitude A1. The flight plan 620 as described above may include an air drop initial point 630 (initial line-up point on flight plan), an initial slowdown point 632 to "drop-speed" airspeed, a look time point to verify final speed, altitude and bearing readings, a release point 636 and an escape point 638, where all of these points on the flight plan 620 may be at a first flight plan altitude A1.

The release point 636 at the first flight plan altitude A1 may have a given wind vector 640 (including wind speed and wing bearing values). A second altitude A2 may have a projected release point 650 (from the flight plan release point 636) including a wind vector 652 of the projected release point at the second altitude A2. This second altitude A2 information for the wind vector 652 may be input into the flight computer to more accurately calculate the free-fall parameters of a deployed flare before ignition and/or burn track of an ignited flare at the second altitude A2. In like manner, a third altitude A3 may have a projected release point 660 (from the flight plan release point 636) including a wind vector 662 of the projected release point at the third altitude A3. This third altitude A3 information for the wind vector 662 may be input into the flight computer to more accurately calculate the burn track of an ignited flare at the third altitude A3.

Figure 7:
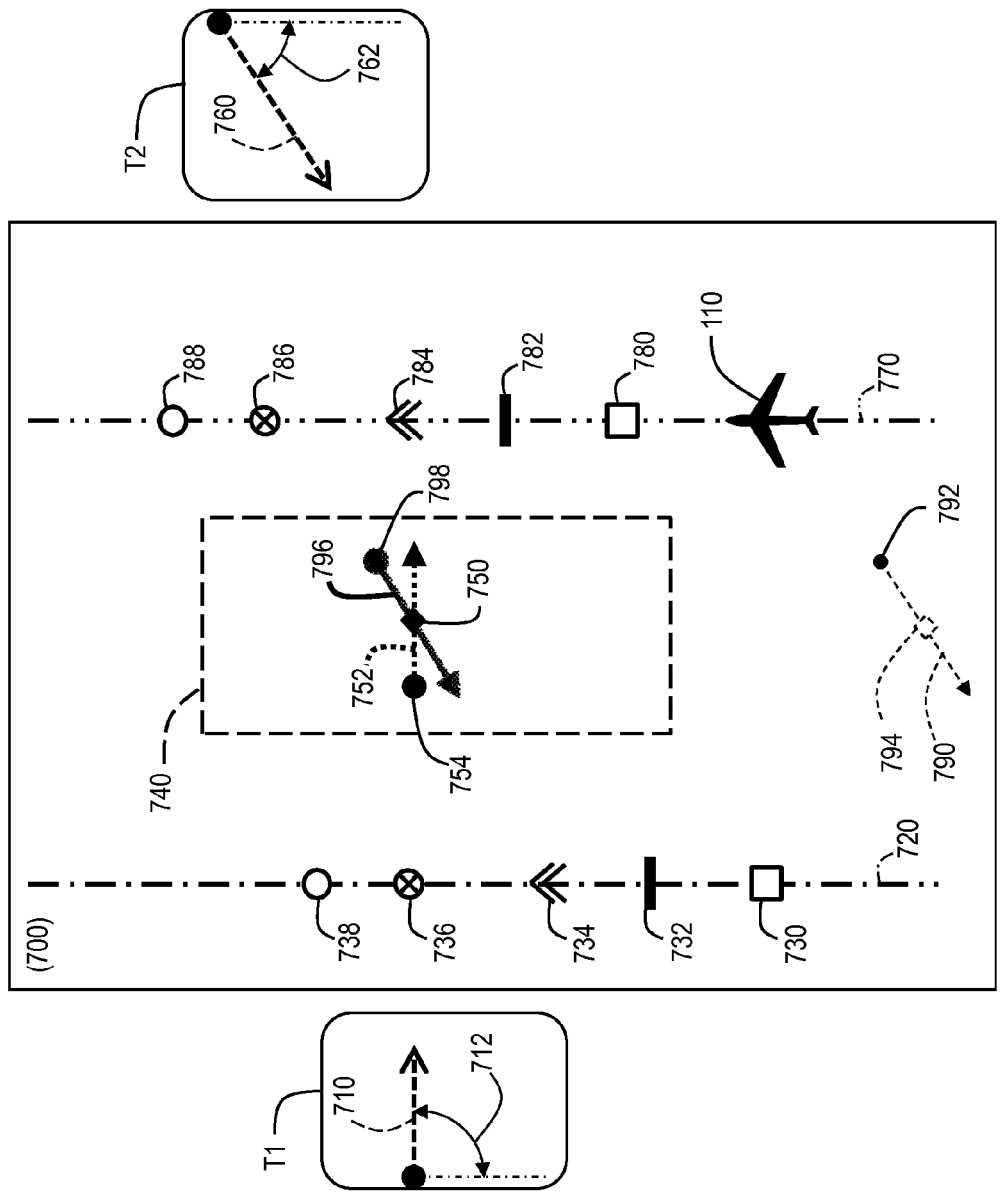
FIG. 7 illustrates a top schematic view of an aircraft on a re-calculated flight path and release point with a flare drift vector symbol relative to a terrain-based operating zone according to at least another embodiment disclosed herein.

FIG. 7 illustrates a top schematic view of an aircraft on a re-calculated flight path and release point with a flare drift vector symbol relative to a terrain-based operating zone according to at least another embodiment disclosed herein. A map portion on a navigation display 700 illustrates a first flight plan 720 planned for a given wind speed 710 and wind direction/angle 712 at a first time T1. As discussed above, the flight computer (not shown) that controls the navigation display may determine or receive input at a first time T1 of a first wind speed 710 and a first wind angle/direction 712 for an intended flare ignition point 754 corresponding to a planned flare drift vector midpoint 750. The planned flare drift vector midpoint 750 coincides with the initial planned geographic coordinate location selected to have the ignited flare's midpoint pass over it to provide illumination to the area of selected location. The first flight plan 720 further includes an air drop initial point 730 for first flight plan (initial line-up point on flight plan), an initial slowdown point to "drop-speed" airspeed 732 for first flight plan, a look time point 734 for first flight plan to verify final speed, altitude and bearing readings, a planned flare release point 736 for first flight plan, and an aircraft/ownship escape point 738 for first flight plan. An operating zone 740 is illustrated in broken lines that contains a planned flare drift vector drift midpoint 750 (battlefield illumination (BFI) waypoint).

At a second time T2, a wind speed 760 at the second time and a wind direction/angle 762 at the second time is measured either independently of the aircraft or by the aircraft and the information is collected by the on-board flight navigation system to determine if the first flight plan 720 is still within operational parameters given a new wind speed and direction. In this exemplary scenario, both the second measured wind speed 760 and second measured wind direction/angle 762 are substantially different from the first wind speed 710 and wind direction/angle 762 (712) at the first time T1. Therefore a new or second release point 786 and flight plan 770 must be calculated for the new second wind speed 760 and the new second wind direction/angle 762 at the second time T2. The new or second flight plan 770 contains an air drop initial point 780 for second flight plan (initial line-up point on flight plan), an initial slowdown point 782 to "drop-speed" airspeed for second flight plan, look time 784 to verify final speed, altitude and bearing readings for second flight plan, a flare release point 786 for second flight plan and an aircraft/ownship escape point 788 for second flight plan. An aircraft/ownship position 110, for example, is illustrated with respect to the second flight plan 770 approaching the air drop initial point 780 on the second flight plan 770, where the navigation display graphically illustrates a current flare drift vector 790 (planned burn track) with respect to the current aircraft/ownship position 110 having a current flare ignition point 792 and a current flare drift vector drift midpoint 794 with respect to the current aircraft/ownship position.

Further illustrated on the map portion of the navigation display 700 is a planned flare drift vector 796 (planned burn track) for second flight plan having a planned flare ignition point 798 for second flight plan based on the second release point 786 of the second flight plan 770 such that a planned flare drift vector drift midpoint 750 (battlefield illumination (BFI) waypoint) is aligned or superimposed on the same point as the flare drift vector 752 calculated from the wind speed 710 and wind direction/angle 712 at a first time T1. Alternately stated, the planned flare drift vector drift midpoint 750 is the same for the first flare drift vector 752 and the second flare drift vector 796 to illuminate the same portion of the operating zone 740 given the new or second wind speed 760 and new or second wind direction/angle at the second time T2.

Figure 8:
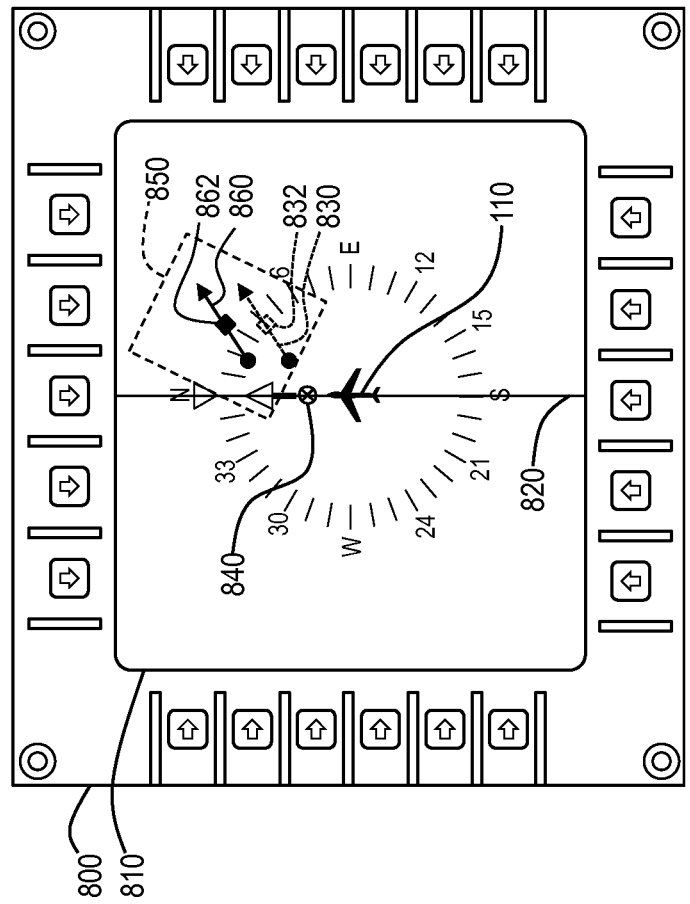
FIG. 8 illustrates a navigation unit having a navigation display with a center oriented ownship position, a flare release point on the flight path and a current and a planned flare drift vector symbols according to at least another embodiment disclosed herein.

FIG. 8 illustrates a navigation unit having a navigation display with a centered ownship position, a flare release point on the flight path and a current and a planned flare drift vector symbols according to at least another embodiment disclosed herein. A navigation display unit 800 contains a navigation display 810 that displays a portion of a navigation map with a superimposed aircraft/ownship position 110 and a flight plan 820 for the aircraft/ownship 110. The navigation display 810 additionally displays a current flare drift vector 830 containing a current flare drift vector midpoint 832 with respect to current position of aircraft/ownship 110. This current flare drift vector 830 represents the current release point and path of the flare if released by the aircraft at the current time relative to the portion of the navigational map on the navigation display 810. This current flare drift vector 830 additionally is maintained on the navigation display 810 at a relative vertical and horizontal distance to the aircraft/ownship position 110 based on the input wind speed and wind direction/angle as discussed above. The current flare drift vector 830 may change both in location with respect to the aircraft/ownship position 110 and length (or distance of the flare path) and direction/angle (flare drift direction) based on new wind speeds or wind directions/angles used to calculate the position and vector characteristics of the current flare drift vector 830.

The navigation display 810 further displays a planned flare release point 840 on the flight plan 820 and superimposed on the map display within, for example, an operating zone 850. A planned flare drift vector 860 is displayed relative to a planned flare drift vector midpoint 862. These elements are "fixed" relative to the planned flare drift vector midpoint 862 on the map display and move relative to the displayed map on the navigation display 810 in real-time based on updated aircraft parameters such as speed and altitude as well as wind speed and wind direction/angle. When the position 110 of the aircraft/ownship is superimposed on the release point 840, the aircraft may either automatically or upon a crew member's command release the flare for deployment.

Figure 9:
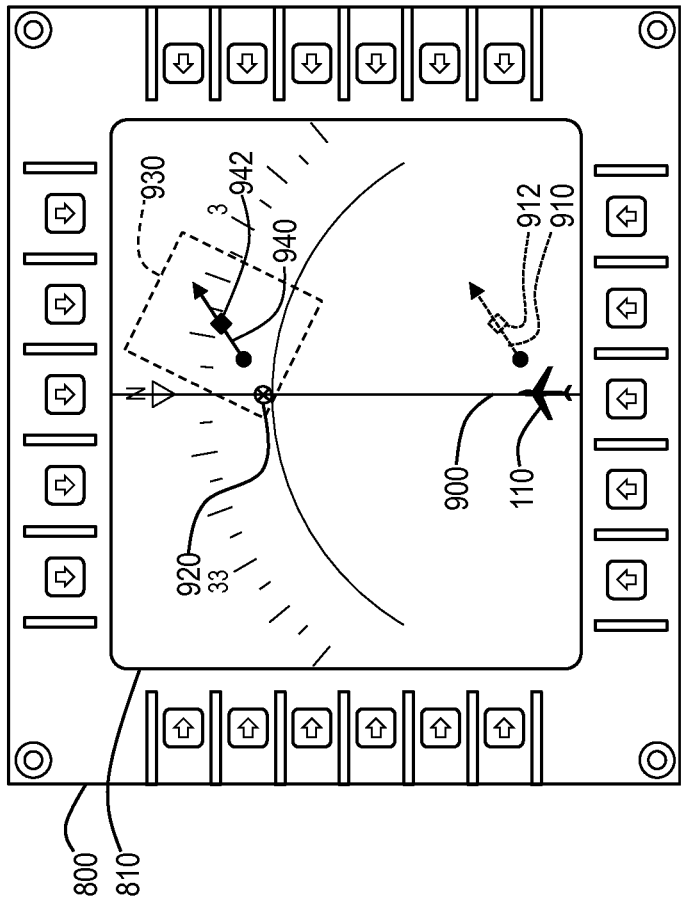
FIG. 9 illustrates a navigation unit having a navigation display with a bottom oriented ownship position, a flare release point on the flight path and a current and a planned flare drift vector symbols according to at least another embodiment disclosed herein.

FIG. 9 illustrates a navigation unit having a navigation display with a de-centered ownship position, a flare release point on the flight path and a current and a planned flare drift vector symbols according to at least another embodiment disclosed herein. A navigation display unit 800 contains a navigation display 810 that displays a portion of a navigation map with a superimposed aircraft/ownship position 110 and a flight plan 900 for the aircraft/ownship 110. The navigation display 810 additionally displays a current flare drift vector 910 containing a current flare drift vector midpoint 912 with respect to current position of aircraft/ownship 110. This current flare drift vector 910 represents the current release point and path of the flare if released by the aircraft at the current time relative to the portion of the navigational map on the navigation display 810. This current flare drift vector 910 additionally is maintained on the navigation display 810 at a relative vertical and horizontal distance to the aircraft/ownship position 110 based on the input wind speed and wind direction/angle, aircraft airspeed, and aircraft direction of travel as discussed above. The current flare drift vector 910 may change both in location with respect to the aircraft/ownship position 110 and length (or distance of the flare path) and direction/angle (flare drift direction) based on new wind speeds or wind directions/angles and new airspeed and aircraft direction of travel used to calculate the position and vector characteristics of the current flare drift vector 910.

The navigation display 810 further displays a planned flare release point 920 on the flight plan 900 and superimposed on the map display within, for example, an operating zone 930. A planned flare drift vector 940 and planned flare release point 920 are displayed relative to a planned flare drift vector midpoint 942 (battlefield illumination waypoint). These elements are "fixed" relative to the planned flare drift vector midpoint 942 on the map display and move relative to the displayed map on the navigation display 810 in real-time based on aircraft parameters such as speed and altitude as well as wind speed and wind direction/angle. When the position 110 of the aircraft/ownship is superimposed on the release point 920, the aircraft may either automatically or upon a crew member's command release the flare for deployment.

Figure 10:
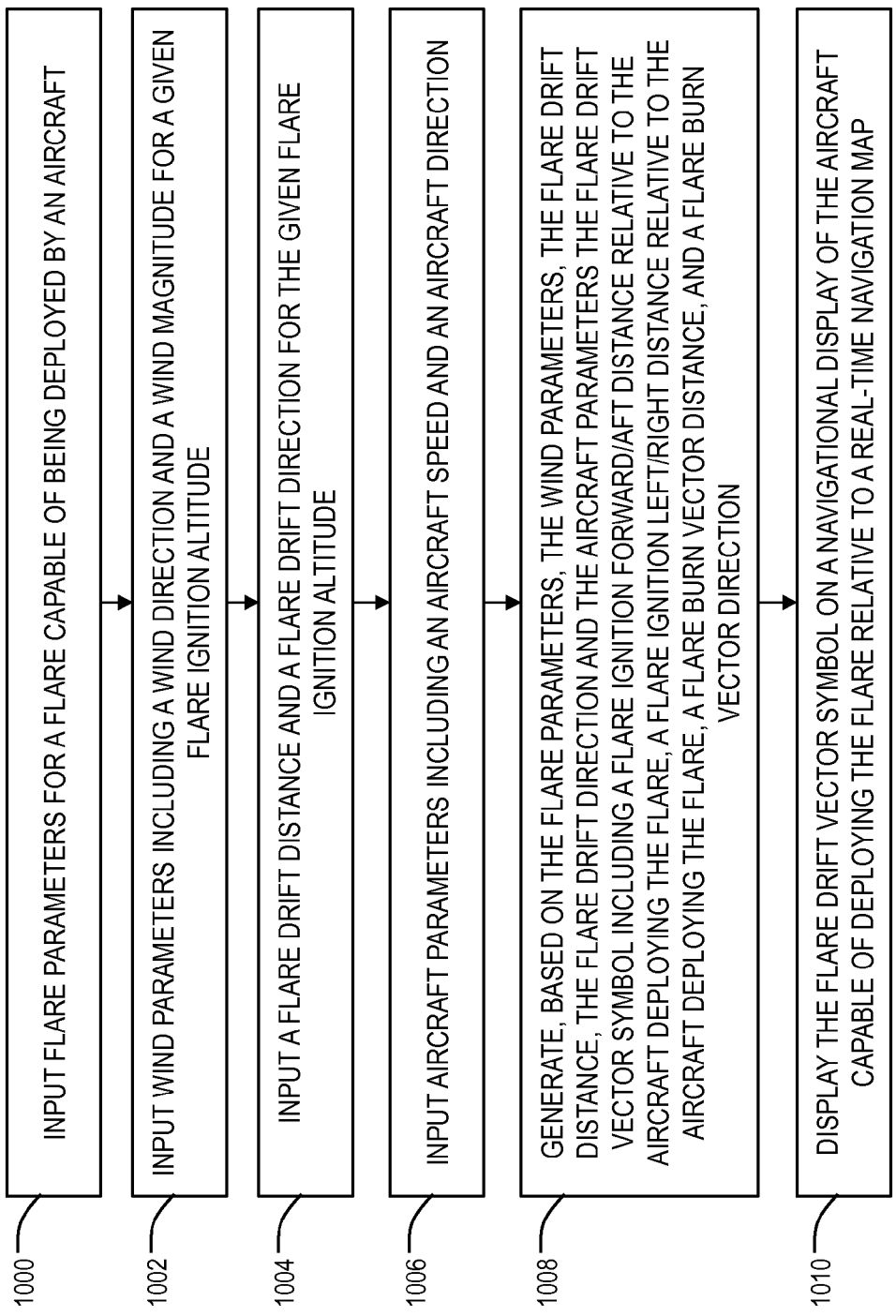
FIG. 10 illustrates a logic flowchart for a method of generating and displaying a flare drift vector symbol according to one embodiment.

FIG. 10 illustrates a logic flowchart for a method of generating and displaying a flare drift vector symbol according to one embodiment disclosed herein. A method of generating and displaying a flare drift vector symbol that includes inputting 1000 into a computing device flare parameters for a flare capable of being deployed by an aircraft, inputting 1002 into the computing device wind parameters including a wind direction and a wind magnitude for a given flare ignition altitude, inputting 1004 into the computing device a flare drift distance and a flare drift direction for the given flare ignition altitude and inputting 1006 into the computing device aircraft parameters including an aircraft speed and an aircraft direction. The method further includes generating 1008, by the computing device, the flare drift vector symbol based on the flare parameters, the wind parameters, the flare drift distance, the flare drift direction and the aircraft parameters. The flare drift vector symbol includes a flare ignition forward/aft distance relative to the aircraft deploying the flare, a flare ignition left/right distance relative to the aircraft deploying the flare, a flare burn vector distance, and a flare burn vector direction. The method further includes displaying 1010 the flare drift vector symbol on a navigation display of the aircraft capable of deploying the flare relative to a real-time navigation map.

The method further includes inputting into the computing device a flare ignition altitude and a flare total burn time. Inputting the wind parameters further includes inputting into the computing device at least one altitude for a corresponding pair of wind direction and wind magnitude values. The method further includes calculating, by the computing device, the flare drift distance and the flare drift direction based on the input flare parameters and the input wind parameters.

Displaying the flare drift vector symbol on the navigation display of the aircraft further includes displaying the flare drift vector symbol relative to a current position of the aircraft. The flare drift vector symbol further includes a graphical mark at a center of the flare drift vector symbol identifying a midpoint of a burn track of the ignited flare relative to the current position of the aircraft. Displaying the flare drift vector symbol on the navigation display of the aircraft further includes displaying the flare drift vector symbol relative to a planned midpoint of a planned burn track of the ignited flare. The flare drift vector symbol further includes a graphical mark at a center of the flare drift vector symbol identifying the planned midpoint (planned battlefield illumination (BFI) waypoint) of the planned burn track of the ignited flare.

Figure 11:
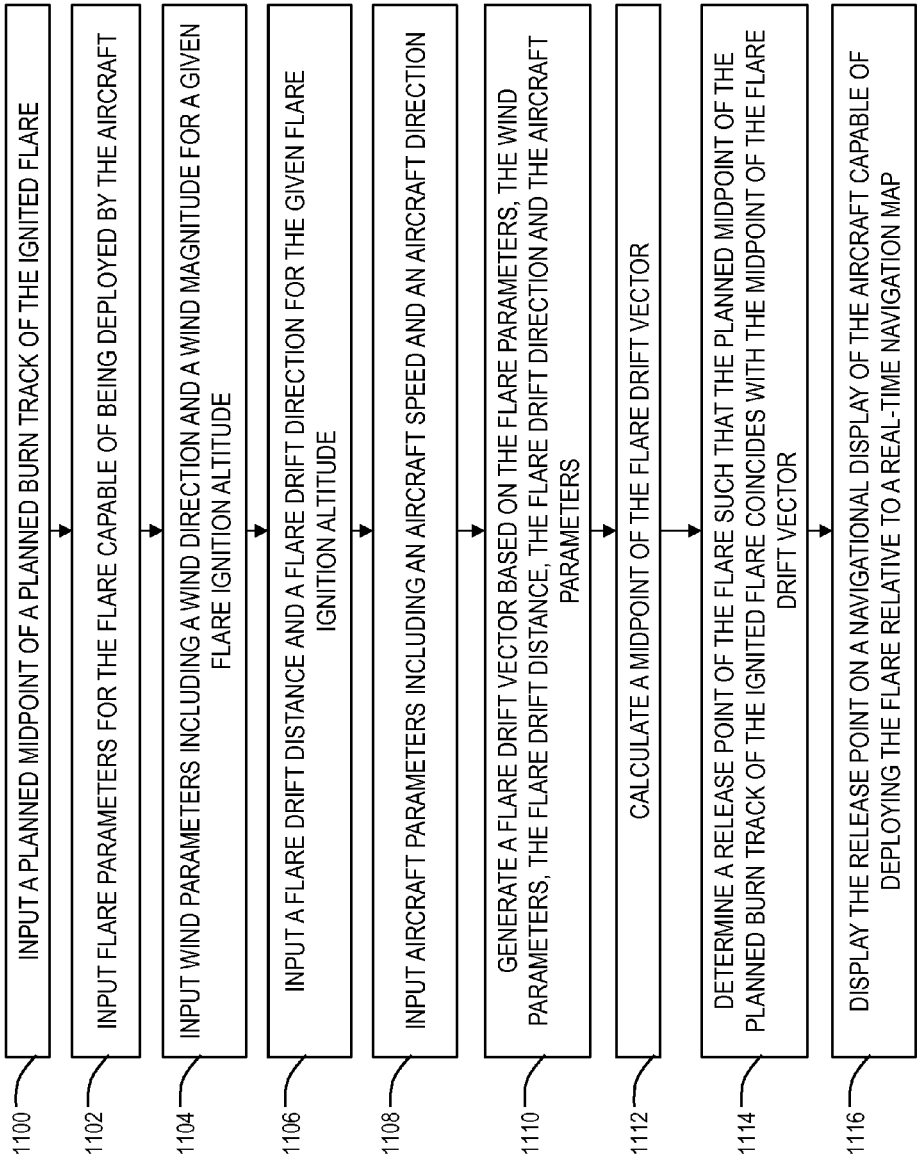
FIG. 11 illustrates a logic flowchart for a method of generating and displaying a release point for a flare capable of being deployed by an aircraft according to another embodiment.

FIG. 11 illustrates a logic flowchart for a method of generating and displaying a release point for a flare capable of being deployed by an aircraft according to another embodiment disclosed herein. A method of generating and displaying a release point for a flare capable of being deployed by an aircraft includes inputting 1100 into a computing device a planned midpoint (planned battlefield illumination (BFI) waypoint) of a planned burn track of the ignited flare, inputting 1102 into the computing device flare parameters for the flare capable of being deployed by the aircraft, inputting 1104 into the computing device wind parameters including a wind direction and a wind magnitude for a given flare ignition altitude, inputting 1106 into the computing device a flare drift distance and a flare drift direction for the given flare ignition altitude, and inputting 1108 into the computing device aircraft parameters including an aircraft speed and an aircraft direction. The method further includes generating 1110 by the computing device a flare drift vector based on the flare parameters, the wind parameters, the flare drift distance, the flare drift direction and the aircraft parameters. The method further includes calculating 1112 by the computing device a midpoint of the flare drift vector, and determining 1114 by the computing device a release point of the flare such that the planned midpoint of the planned burn track of the ignited flare coincides with the midpoint of the flare drift vector. The method further includes displaying 1116 the release point on a navigation display of the aircraft capable of deploying the flare relative to a real-time navigation map.

The flare drift vector includes a flare ignition forward/aft distance relative to the aircraft deploying the flare and the release point of the flare, and a flare ignition left/right distance relative to the aircraft deploying the flare and the release point of the flare.

The method further includes displaying the flare drift vector as a symbol on the navigation display of the aircraft capable of deploying the flare relative to the real-time navigation map. Displaying the flare drift vector symbol on the navigation display of the aircraft further includes displaying the flare drift vector symbol relative to a current position of the aircraft. Displaying the flare drift vector symbol on the navigation display of the aircraft further includes displaying the flare drift vector symbol relative to the planned midpoint of the planned burn track of the ignited flare.

Figure 12:
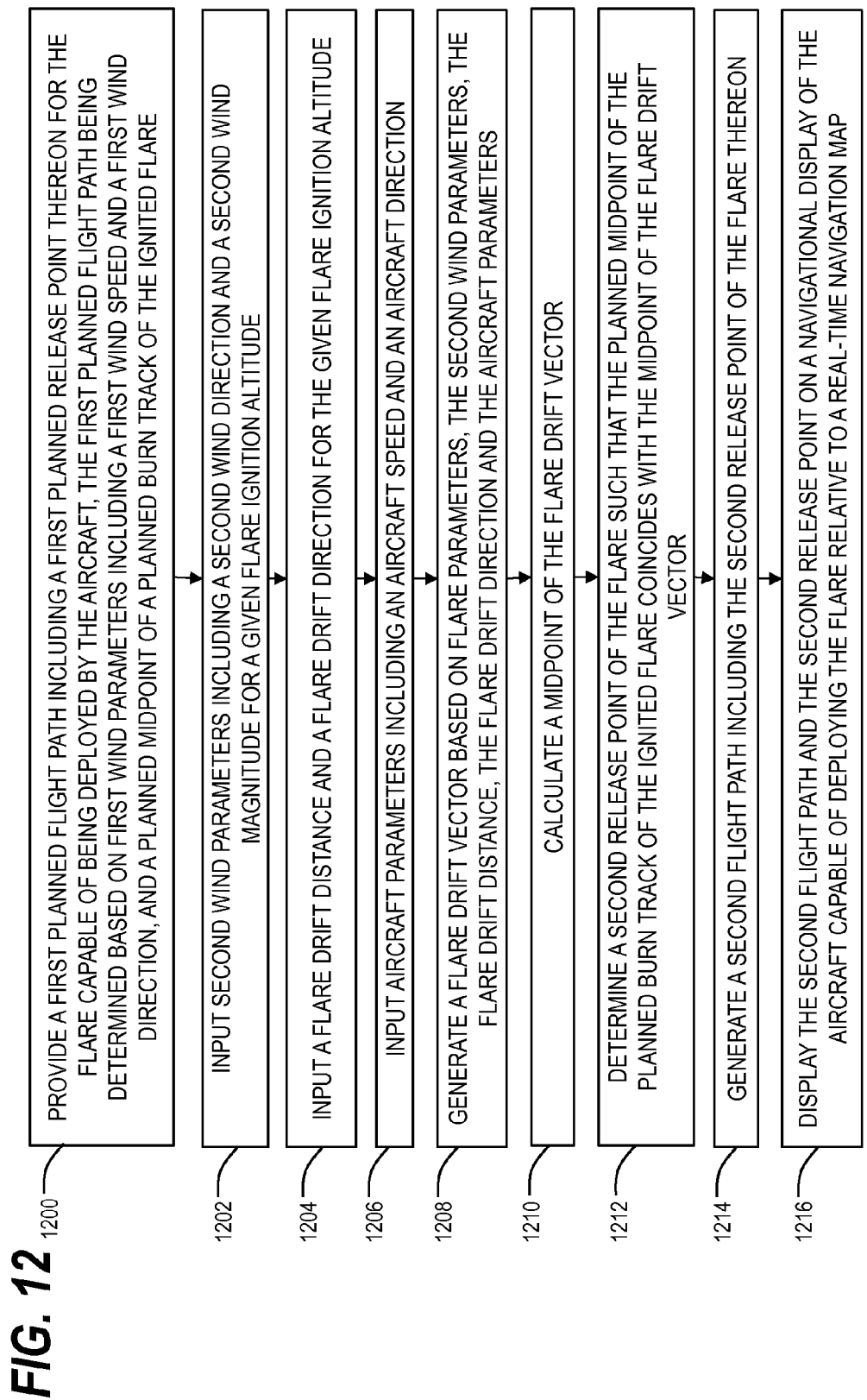
FIG. 12 illustrates a logic flowchart for a method of recalculating and displaying a flight path and an associated release point for a flare capable of being deployed by an aircraft according to another embodiment; and, FIG. 13 illustrates a computer architecture diagram showing an illustrative computer hardware and software architecture for a computing system capable of implementing the embodiments presented herein.

FIG. 12 illustrates a logic flowchart for a method of recalculating and displaying a release point and an associated flight path for a flare capable of being deployed by an aircraft according to another embodiment disclosed herein. A method of recalculating and displaying a release point and an associated flight path for a flare capable of being deployed by an aircraft includes providing 1200 a first planned flight path including a first planned release point thereon for the flare capable of being deployed by the aircraft, the first planned flight path being determined based on first wind parameters including a first wind speed and a first wind direction, and a planned midpoint (planned battlefield illumination (BFI) waypoint) of a planned burn track of the ignited flare. The method further includes inputting 1202 into a computing device second wind parameters including a second wind direction and a second wind magnitude for a given flare ignition altitude, inputting 1204 into the computing device a flare drift distance and a flare drift direction for the given flare ignition altitude, and inputting 1206 into the computing device aircraft parameters including an aircraft speed and an aircraft direction. The method further includes generating 1208 by the computing device a flare drift vector based on flare parameters, the second wind parameters, the flare drift distance, the flare drift direction and the aircraft parameters. The method further includes calculating 1210 by the computing device a midpoint of the flare drift vector, and determining 1212 by the computing device a second release point of the flare such that the planned midpoint of the planned burn track of the ignited flare coincides with the midpoint of the flare drift vector. The method further includes generating 1214 by the computing device a second release point including the second flight path of the flare thereon, and displaying 1216 the second release point and the second flight path on a navigation display of the aircraft capable of deploying the flare relative to a real-time navigation map.

The flare drift vector includes a flare ignition forward/aft distance relative to the aircraft deploying the flare and the release point of the flare, and a flare ignition left/right distance relative to the aircraft deploying the flare and the release point of the flare.

The method further includes displaying the flare drift vector as a symbol on the navigation display of the aircraft capable of deploying the flare relative to the real-time navigation map. Displaying the flare drift vector symbol on the navigation display of the aircraft further includes displaying the flare drift vector symbol relative to a current position of the aircraft. Displaying the flare drift vector symbol on the navigation display of the aircraft further includes displaying the flare drift vector symbol relative to the planned midpoint of the planned burn track of the ignited flare.

Figure 13:
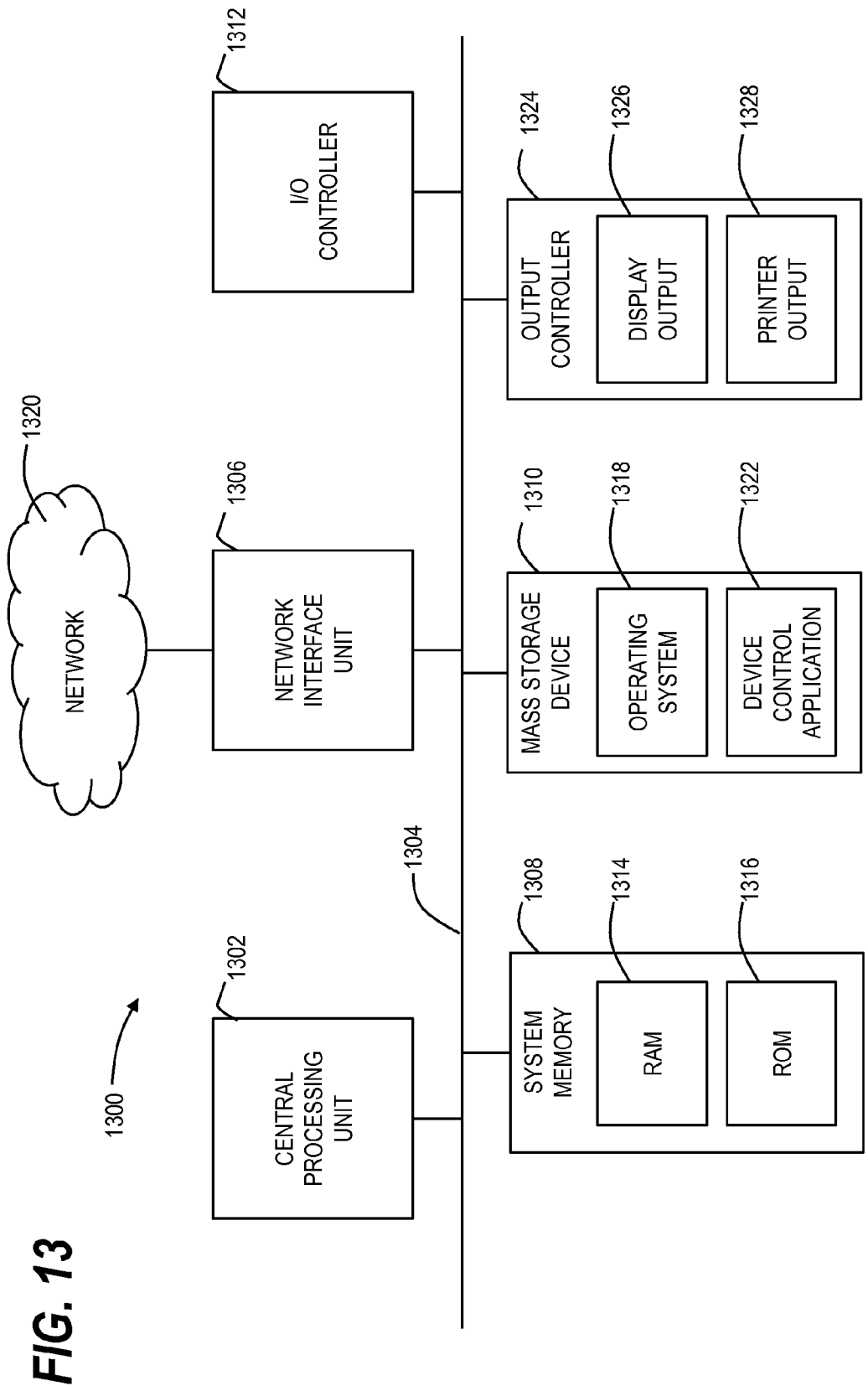

FIG. 13 is a computer architecture diagram showing an illustrative computer hardware and software architecture for a computing system capable of implementing the embodiments presented herein. FIG. 13 shows illustrative computer architecture for a computer 1300 capable of executing the software components described herein for implementing the embodiments described above. The computer architecture shown in FIG. 13 illustrates a conventional desktop, laptop computer, server computer, tablet computer, smartphone, electronic reader, MP3 player or other digital music device, or any flight computer configured for use with an aircraft system and may be utilized to implement the computer 1300 and to execute any of the other software components described herein.

The computer architecture shown in FIG. 13 includes a central processing unit 1302 (CPU) or processor, a system memory 1308, including a random access memory 1314 (RAM) and a read-only memory (ROM) 1316, and a system bus 1304 that couples the memory to the CPU 1302. A basic input/output system (BIOS) containing the basic routines that help to transfer information between elements within the computer 1300, such as during startup, is stored in the ROM 1316. The computer 1300 further includes a mass storage device 1310 for storing an operating system 1318, application programs, and other program modules, which will be described in greater detail below.

The mass storage device 1310 is connected to the CPU 1302 through a mass storage controller (not shown) connected to the bus 1304. The mass storage device 1310 and its associated computer-readable media provide non-volatile storage for the computer 1300. Although the description of computer-readable media contained herein refers to a mass storage device, such as a hard disk or CD-ROM drive, it should be appreciated by those skilled in the art that computer-readable storage media can be any available computer storage media that can be accessed by the computer 1300.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any non-transitory medium which can be used to store the desired information and which can be accessed by the computer 1300.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 1300 may operate in a networked environment using logical connections to remote computers through a network such as the network 1320. The computer 1300 may connect to the network 1320 through a network interface unit 1306 connected to the bus 1304. It should be appreciated that the network interface unit 1306 may also be utilized to connect to other types of networks and remote computer systems. The computer 1300 may also include an input/output controller 1312 for receiving and processing input from a number of other devices, including a touchscreen interface 100, keyboard, mouse, joystick, or electronic stylus (not shown in FIG. 13). Similarly, an output controller 1324 may provide output to a display screen 1326 similar to the navigation displays illustrated in FIGS. 1, 4, 5 and 7-9, a printer 1328, or other type of output device.

As mentioned briefly above, a number of program modules and data files may be stored in the mass storage device 1310 and RAM 1314 of the computer 1300, including an operating system 1318 suitable for controlling the operation of a networked desktop, laptop, tablet, smartphone, electronic reader, digital music player, server, or flight computer. The mass storage device 1310 and RAM 1314 may also store one or more program modules. In particular, the mass storage device 1310 and the RAM 1314 may store the device control application 1322 executable to perform the various operations described above. The mass storage device 1310 and RAM 1314 may also store other program modules and data.

In general, software applications or modules may, when loaded into the CPU 1302 and executed, transform the CPU 1302 and the overall computer 1300 from a general-purpose computing system into a special-purpose computing system customized to perform the functionality presented herein. The CPU 1302 may be constructed from any number of transistors or other discrete circuit elements, which may individually or collectively assume any number of states. More specifically, the CPU 1302 may operate as one or more finite-state machines, in response to executable instructions contained within the software or modules. These computer-executable instructions may transform the CPU 1302 by specifying how the CPU 1302 transitions between states, thereby physically transforming the transistors or other discrete hardware elements constituting the CPU 1302.

Encoding the software or modules onto a mass storage device may also transform the physical structure of the mass storage device or associated computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer-readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A method of generating and displaying a release point for a flare capable of being deployed by an aircraft, the method comprises:
    inputting into a computing device a planned midpoint of a planned burn track of the ignited flare corresponding to a geographic coordinate;
    inputting into the computing device flare parameters for the flare capable of being deployed by the aircraft;
    inputting into the computing device wind parameters including a wind direction and a wind magnitude for a given flare ignition altitude;
    inputting into the computing device a flare drift distance and a flare drift direction for the given flare ignition altitude;
    inputting into the computing device aircraft parameters including an aircraft speed and an aircraft direction;
    generating by the computing device a flare drift vector based on the flare parameters, the wind parameters, the flare drift distance, the flare drift direction and the aircraft parameters;
    calculating by the computing device a midpoint of the flare drift vector;
    determining by the computing device a release point of the flare such that the planned midpoint of the planned burn track of the ignited flare coincides with the midpoint of the flare drift vector; and
    displaying the release point on a navigation display of the aircraft capable of deploying the flare relative to a real-time navigation map.

2. The method according to claim 1, wherein inputting the flare parameters includes inputting into the computing device a flare ignition altitude and a flare total burn time.

3. The method according to claim 1, wherein inputting the wind parameters further comprises:
    inputting into the computing device at least one altitude for a corresponding pair of wind direction and wind magnitude values.

4. The method according to claim 1, further comprising:
    calculating, by the computing device, the flare drift distance and the flare drift direction based on the input flare parameters and the input wind parameters.

5. The method according to claim 1, wherein the aircraft parameters further include at least one of an aircraft altitude, an aircraft direction, an aircraft ambient temperature.

6. The method according to claim 1, wherein the flare drift vector includes
    a flare ignition forward/aft distance relative to the release point of the flare,
    a flare ignition left/right distance relative to the release point of the flare.

7. The method according to claim 6, wherein determining by the computing device the release point of the flare is based upon
    the flare ignition forward/aft distance relative to the planned midpoint of the planned burn track, and
    the flare ignition left/right distance relative to the planned midpoint of the planned burn track.

8. The method according to claim 1, further comprising:
    displaying the flare drift vector as a symbol on the navigation display of the aircraft capable of deploying the flare relative to the real-time navigation map.

9. The method according to claim 8, wherein the flare drift vector symbol further includes
    a flare ignition forward/aft distance relative to the aircraft deploying the flare,
    a flare ignition left/right distance relative to the aircraft deploying the flare,
    a flare burn vector distance,
    a flare burn vector direction, and
    a graphical mark at a center of the flare drift vector symbol identifying a midpoint of a burn track of the ignited flare relative to the current position of the aircraft.

10. The method according to claim 8, wherein the flare drift vector symbol further includes
    a flare ignition forward/aft distance relative to the planned midpoint of a planned burn track,
    a flare ignition left/right distance relative to the planned midpoint of a planned burn track,
    a flare burn vector distance,
    a flare burn vector direction, and
    a graphical mark at a center of the flare drift vector symbol identifying the planned midpoint of the planned burn track of the ignited flare.

11. The method according to claim 8, wherein displaying the flare drift vector symbol on the navigation display of the aircraft further comprises displaying the flare drift vector symbol relative to a current position of the aircraft.

12. The method according to claim 8, wherein displaying the flare drift vector symbol on the navigation display of the aircraft further comprises displaying the flare drift vector symbol relative to the planned midpoint of the planned burn track of the ignited flare.

13. A method of recalculating and displaying a release point and an associated flight path for a flare capable of being deployed by an aircraft, the method comprising:
    providing a first planned flight path including a first planned release point thereon for the flare capable of being deployed by the aircraft, the first planned flight path being determined based on first wind parameters including a first wind speed and a first wind direction, and a planned midpoint of a planned burn track of the ignited flare where the planned midpoint is located at a selected geographical location;

inputting into a computing device second wind parameters including a second wind direction and a second wind magnitude for a given flare ignition altitude;

inputting into the computing device a flare drift distance and a flare drift direction for the given flare ignition altitude;

inputting into the computing device aircraft parameters including an aircraft speed and an aircraft direction;

generating by the computing device a flare drift vector based on flare parameters, the second wind parameters, the flare drift distance, the flare drift direction and the aircraft parameters;

calculating by the computing device a midpoint of the flare drift vector;

determining by the computing device a second release point of the flare such that the planned midpoint of the planned burn track of the ignited flare coincides with the midpoint of the flare drift vector;

generating by the computing device a second flight path including the second release point of the flare thereon; and displaying the second release point and the second flight path on a navigation display of the aircraft capable of deploying the flare relative to a real-time navigation map.

14. The method according to claim 13, wherein the flare drift vector includes a flare ignition forward/aft distance relative to the planned midpoint of the planned burn track, a flare ignition left/right distance relative to the planned midpoint of the planned burn track, and wherein determining by the computing device the second release point of the flare is based upon the flare ignition forward/aft distance relative to the planned midpoint of the planned burn track, and the flare ignition left/right distance relative to the planned midpoint of the planned burn track.

15. The method according to claim 13, further comprising:

displaying the flare drift vector as a symbol on the navigation display of the aircraft capable of deploying the flare relative to the real-time navigation map.

16. The method according to claim 15, wherein displaying the flare drift vector symbol on the navigation display of the aircraft further comprises displaying the flare drift vector symbol relative to a current position of the aircraft.

17. The method according to claim 15, wherein displaying the flare drift vector symbol on the navigation display of the aircraft further comprises displaying the flare drift vector symbol relative to the planned midpoint of the planned burn track of the ignited flare.

\* \* \* \* \*